Dec. 20, 1966   M. W. MOEN   3,292,831
SLING FOR USE IN ROASTING TURKEYS AND THE LIKE
Filed Feb. 8, 1965

INVENTOR.
MORRIS W. MOEN
BY
*Meyers & Peterson*
ATTORNEYS

United States Patent Office 3,292,831
Patented Dec. 20, 1966

3,292,831
SLING FOR USE IN ROASTING TURKEYS
AND THE LIKE
Morris W. Moen, 628 9th Ave.,
Two Harbors, Minn. 55616
Filed Feb. 8, 1965, Ser. No. 430,869
2 Claims. (Cl. 224—49)

This invention relates generally to a sling for use in roasting turkeys, chickens, meat and other items of food.

One object of the invention is to provide a sling that is made entirely of flexible cord or string. In this way, the sling can be fabricated at a relatively low cost and thereby allow it to be thrown away after it has been used but only once; on the other hand, the material from which the sling is made permits the user to wash the sling and use it repeatedly if he or she so desires. Actually, it is within the contemplation of the invention to manufacture the envisaged sling so inexpensively that it can be used as a premium in the promotion of the sale of various merchandise, particularly turkeys and chickens.

Another object of the invention is to provide an adequate amount of support over a relatively large portion of the fowl or piece of meat so that the item of food will not fall apart when removing it from the oven or other roaster it might be cooked in. Consequently, even though the fowl or meat reaches an advanced stage of cooking such that it would tend to separate, a sling constructed in accordance with the teachings of the present invention obviates any likelihood of parts of the cooked food from being detached and thus dropping when the food is picked up, either for complete removal from the roaster or to turn the food for cooking other portions thereof that have not as yet been properly exposed to the cooking heat.

A further aim of the invention is to provide a sling that enables the user to firmly grip the sling and thus assure that even the entire food item will not shift within the sling to such an extent that it is likely to drop out. Consequently, the sling affords all the assurance needed to make certain that the fowl or meat can be properly handled at all times.

Yet another object of the invention is to provide a sling that can be made in various sizes without having to resort to mechanical parts that might require modification in order to produce a sling, say, of a smaller size. All that need be done is to cut the cord length such that the sling will be readily suitable for a chicken or a small roast if this is the only food item to be cooked, yet on the other hand if a large turkey or piece of meat is to be cooked, then the cords or strings can be cut somewhat longer in order to accommodate the larger item of food.

Still another object of the invention is to provide a sling of the foregoing character that will utilize no metallic parts that might become sufficiently hot so as to burn the user's fingers.

Yet another object of the invention is to provide a flexible sling that can be folded to whatever extent is desired, thereby occupying only a small amount of space which is advantageous in the packaging of the sling. For instance, in the merchandising of frozen turkeys, the sling can be folded until it is of sufficiently small size so as to be placed at one end of the fowl or even within the confines of the fowl. On the other hand, the entire turkey or other food item can have the sling encircling it in much the same manner that the sling would be used when roasting the food item since the flexible sling conforms easily to irregular contours. As far as premium items are concerned, if the sling is to be forwarded to the purchaser of a given food item when a coupon is sent in, the sling can be easily mailed owing to both its compactness and light weight.

Still further, the invention has for an additional object the provision of a sling that is made of cord or string that can be impregnated with a fire-resistant compound if desired, even though it is not likely that ordinary cord and string material will burn or char. In this way, depending upon the particular food item to be roasted, it is entirely feasible and economical to make it such that the sling can be subjected to extremely high temperatures. This might very well be required in the broiling of certain foods, where it is contemplated that the food will be relatively close to the heating element or even in contact with a flame. In this regard, it is thought that the flexible character of the sling will allow it to be wrapped around the food article even when on a rotisserie or when placed on a backyard type of brazier, such types of cooking apparatus exposing the food item to a high degree of heat.

These and other objects and advantages of my invention will more fully appear from the following description, made in connection with the accompanying drawing, wherein like reference characters refer to the same or similar parts throughout the several views and in which.

Figure 1:
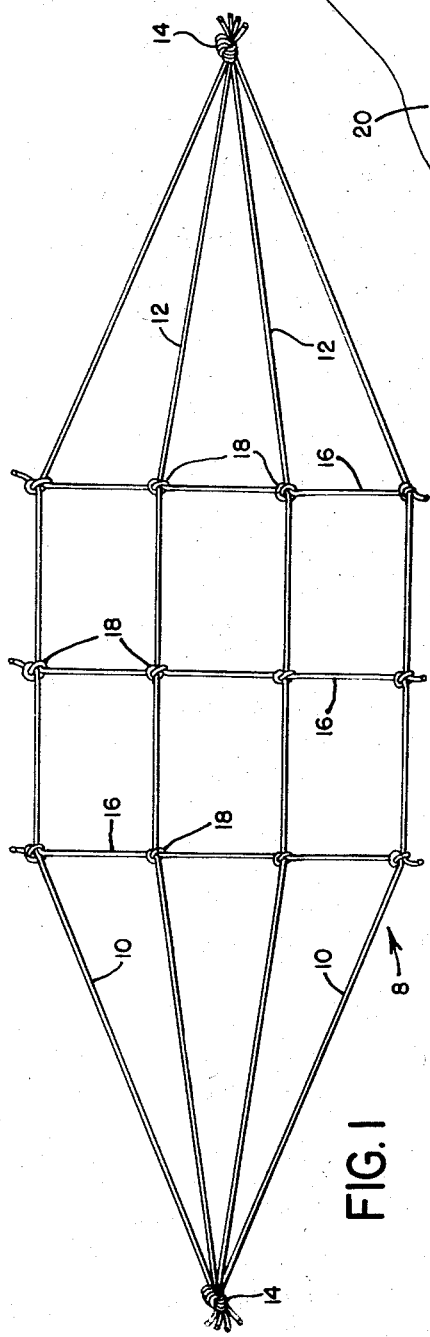
FIGURE 1 is a top plan view of my sling when spread out for the purpose of laying a turkey or the like thereon.
Figure 2:
FIGURE 2 is a detail view of one of the knots at the ends of the sling.
Figure 3:
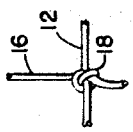
FIGURE 3 is a detail view of one of the knots utilized intermediate the ends of the sling.

Referring now in detail to FIGURE 1, it will be seen that the sling has been designated in its entirety by the reference numeral 8. The sling 8 consists of a first pair of cord members 10 of equal length. A second pair of cord members 12 are also employed, these latter cord members being somewhat shorter than the members 10. The opposite ends of the cord members 10 and 12 are tied together by means of knots 14. One such knot 14 appears in FIGURE 2.

A trio of additional cord members 16 extend transversely to the cord members 10 and 12, the cord members 16 being attached at spaced locations to the cord members 10 and 12 through the agency of knots 18. It will be noted that the knots 18 are not only spaced along the length of each cord member 16 but are also spaced along the length of the cord members 10 and 12.

Figure 4:
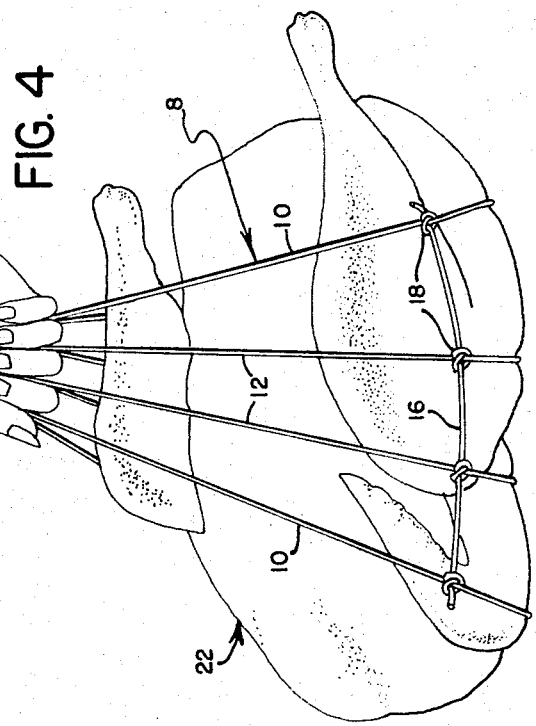
FIGURE 4 is a perspective view of a turkey being lifted when my sling is employed.

Consequently, when the sling 8 is used in the manner depicted in FIGURE 4, the knots 14 form a number of loops that can readily receive the fingers of a person's hand 20 when picking up a turkey 22. All that the user need do is spread out the sling in the form pictured in FIGURE 1 and then place the turkey 12 onto the sling 8, the insertion of one's fingers as shown in FIGURE 4 then allowing the turkey 12 to be handled without difficulty. The transverse cord members 16 assure that the cord members 10 and 12 will not separate to any great degree and will assure that no portion of the turkey 22, even though the turkey might become quite well done, will fall out during the handling procedure.

Having picked up the turkey 22 in the fashion illustrated in FIGURE 4, it should be readily apparent that the turkey can be placed in or on whatever kind of cooking apparatus that is to be employed. Usually, the turkey 22 will be placed in a pan and the sling 8 allows the turkey to be easily lowered into such a utensil so that the pan can then be placed in an oven. On the other hand, the embracing of the turkey 22 or other food article will enable the user to set the item into an oven or onto a grill without the use of such a pan.

Consequently, it will be recognized that the sling 8 is quite versatile, allowing the item of food to be handled in the most appropriate manner for the particular type of cooking apparatus to be employed. The process is readily reversed when the cooking or roasting has been completed or when there is to be a turning of the turkey 22 or other article. Actually, it is not necessary even when the article is uncooked that it be in one piece, for the invention easily permits a plurality of items to be handled. For example, various pieces of meat might require cooking and these can all be placed onto the sling 8 when spread out in the form appearing in FIGURE 1 with the assurance that all of the pieces will be picked up collectively.

It will, of course, be understood that various changes may be made in the form, details, arrangements and proportions of the parts without departing from the scope of my invention as set forth in the appended claims.

What is claimed:

1. A sling for use in roasting turkeys and the like comprising at least four spaced longitudinally extending flexible cords, two of which cords are of the same length and two of which cords are of a shorter length, a knot joining said cords together at each end to form finger holds, at least three additional flexible cords of the same length extending transversely of the longitudinally extending cords, and a knot joining each of said additional cords to each of said longitudinal cords at their point of intersection, said last-mentioned knots each being spaced from each other.

2. A sling in accordance with claim 1 in which said additional cords are shorter than the shorter two of said longitudinal cords.

References Cited by the Examiner

UNITED STATES PATENTS

| | | | |
|---|---|---|---|
| 1,325,025 | 12/1919 | Linnertz | 224—49 |
| 1,457,304 | 6/1923 | Hodgson | 294—77 |
| 2,297,332 | 9/1942 | Stewart | 294—77 |
| 2,514,098 | 7/1950 | Shreiner | 294—74 |
| 2,829,853 | 4/1958 | Wheeler et al. | 224—49 |

GERALD M. FORLENZA, *Primary Examiner.*

J. E. OLDS, *Assistant Examiner.*